(12) United States Patent
Bougaev et al.

(10) Patent No.: US 8,055,928 B2
(45) Date of Patent: Nov. 8, 2011

(54) METHOD FOR CHARACTERIZING THE HEALTH OF A COMPUTER SYSTEM POWER SUPPLY

(75) Inventors: Anton A. Bougaev, La Jolla, CA (US); Aleksey M. Urmanov, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 605 days.

(21) Appl. No.: 12/200,775

(22) Filed: Aug. 28, 2008

(65) Prior Publication Data
US 2010/0058092 A1    Mar. 4, 2010

(51) Int. Cl.
| G06F 1/00 | (2006.01) |
| G06F 11/00 | (2006.01) |
| G05F 5/00 | (2006.01) |
| F02P 3/02 | (2006.01) |
| H02M 7/34 | (2006.01) |
| H02M 7/12 | (2006.01) |
| H02M 7/00 | (2006.01) |
| G01R 21/00 | (2006.01) |
| G01R 19/00 | (2006.01) |

(52) U.S. Cl. ........ 713/340; 713/300; 323/207; 323/371; 363/108; 363/114; 363/125; 702/60; 702/64; 714/14; 714/22; 714/45; 714/47.3

(58) Field of Classification Search .................. 713/300, 713/340; 323/207, 371; 363/108, 114, 125; 702/60, 64; 714/14, 22, 45, 47.3
See application file for complete search history.

(56) References Cited

U.S. PATENT DOCUMENTS

| 7,184,935 B1 * | 2/2007 | Cohen et al. ................. 702/186 |
| 7,502,971 B2 * | 3/2009 | Cohen et al. ................... 714/45 |
| 7,804,415 B2 * | 9/2010 | Cheng et al. ................. 340/635 |
| 7,853,848 B2 * | 12/2010 | Desineni et al. .............. 714/732 |
| 2006/0047995 A1 * | 3/2006 | Schriek ............................ 714/2 |

* cited by examiner

*Primary Examiner* — Stefan Stoynov
(74) *Attorney, Agent, or Firm* — Park, Vaughan, Fleming & Dowler LLP

(57) ABSTRACT

Some embodiments of the present invention provide a system that controls a device that characterizes the health of a computer system power supply. During operation, a signature for the power supply is generated based on measurements of a set of performance parameters for the power supply. Then, the health of the power supply is characterized based on a comparison between the signature for the power supply and signatures for one or more other power supplies.

16 Claims, 3 Drawing Sheets

METHOD FOR CHARACTERIZING THE HEALTH OF A COMPUTER SYSTEM POWER SUPPLY

BACKGROUND

1. Field

The present invention relates to techniques for characterizing a computer system. More specifically, the present invention relates to a method and apparatus that characterizes the health of a power supply in a computer system during operation of the computer system.

2. Related Art

Computer system manufacturers depend on mean time between failure (MTBF) estimates for power supplies to help determine the reliability of their computer systems. In order to maintain a dependable updated assessment of the condition of an individual power supply in a computer system, some power supplies include sensors to help monitor the power supply. However, although such sensors may allow the health of a power supply to be characterized, sensor readings from individual power supplies may not catch trends or patterns in an installed base of power supplies that fail in similar but previously unrecognized ways. For example, if a batch of power supplies is manufactured with faulty capacitors, an analysis of the sensor readings from an individual power supply may give little advanced warning that the power supply is starting to show effects due to the faulty component if the power supply is otherwise operating within its specifications.

Hence, what is needed is a method and apparatus that characterizes the health of a power supply in a computer system during operation of the computer system without the above-described problems.

SUMMARY

Some embodiments of the present invention provide a system that characterizes the health of a power supply in a computer system during operation of the computer system. During operation, a signature for the power supply is generated based on measurements of a set of performance parameters for the power supply. Then, the health of the power supply is characterized based on a comparison between the signature for the power supply and signatures for one or more other power supplies.

In some embodiments, the one or more other power supplies include failed power supplies.

In some embodiments, characterizing the health of the power supply includes determining signature distances between the signature for the power supply and the signatures for the one or more other power supplies.

In some embodiments, characterizing the health of the power supply includes characterizing the health of the power supply into at least three categories based on signature distances between the signature for the power supply and the signatures for the one or more other power supplies.

In some embodiments, characterizing the health of the power supply based on a comparison between the signature for the power supply and signatures for one or more other power supplies includes using a pattern-recognition classifier.

Some embodiments further include periodically communicating the power-supply signature and the signatures for the one or more other power supplies to a doctor server, wherein characterizing the health of the power supply includes characterizing the health of the power supply based on signature distances between the signature for the power supply and the signatures for the one or more other power supplies.

Some embodiments further include initiating a service action for the power supply based on the health of the power supply.

Some embodiments further include recommending an operating mode for the power supply based on the comparison between the signature for the power supply and signatures for one or more other power supplies.

In some embodiments, generating the signature for the power supply includes systematically monitoring and recording a set of performance parameters, wherein the recording process keeps track of the temporal relationships between events in different performance parameters.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
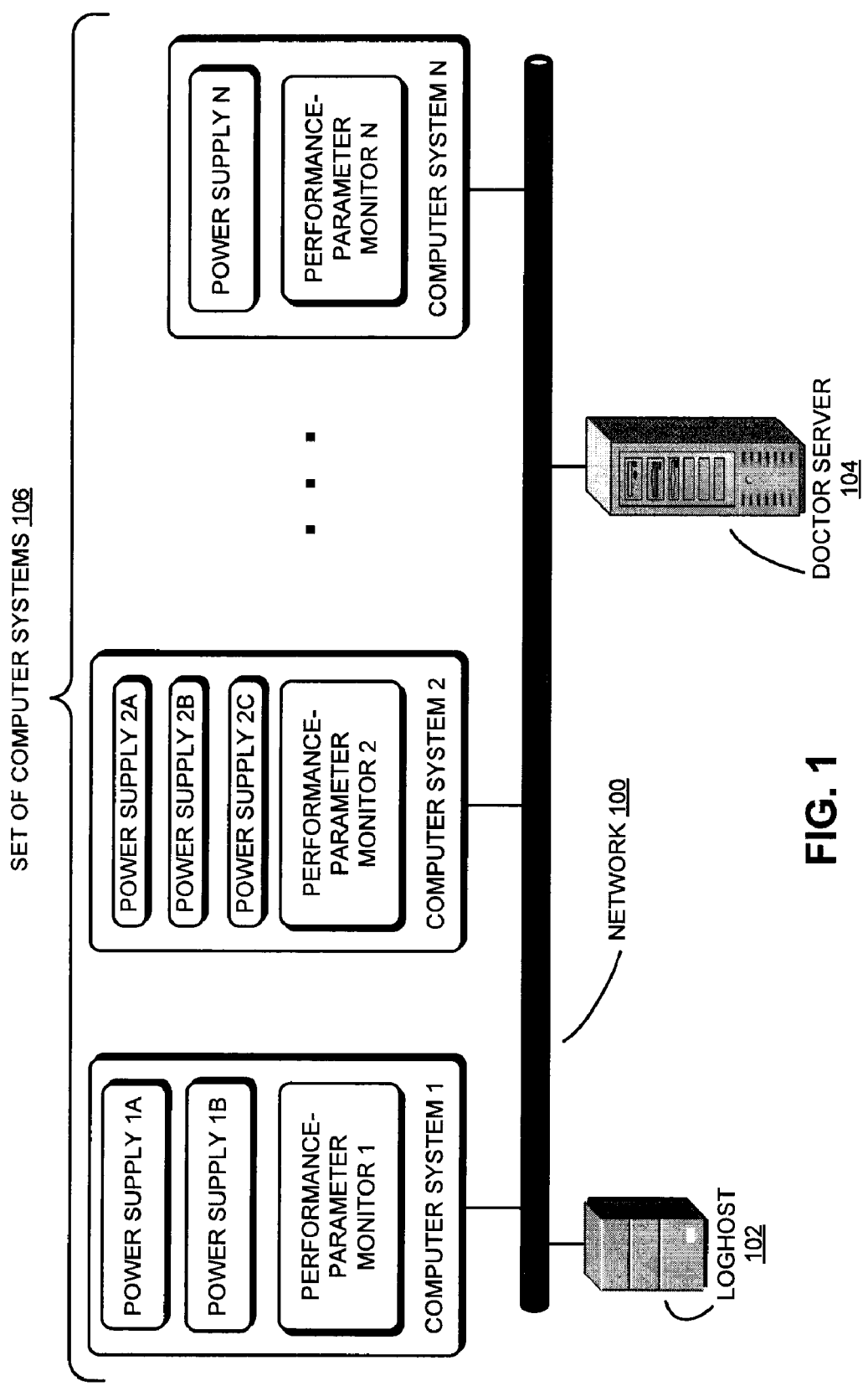
FIG. 1 represents a system that characterizes the health of a power supply in a computer system during operation of the computer system in accordance with some embodiments of the present invention.

FIG. 1 represents a system that characterizes the health of a power supply in a computer system during operation of the computer system in accordance with some embodiments of the present invention. Within FIG. 1, network 100 is connected to loghost 102, doctor server 104, and set of computer systems 106. Set of computer systems 106 includes N computer systems; for simplicity, only three of the N computer systems (1, 2, and N) are depicted.

Network 100 can include any system that allows computers to communicate with each other, including but not limited to any combination of one or more of the following computer networks: an intranet, an extranet, and/or the Internet. Note that any of the networks can include one or more wireless links.

Loghost 102 can include any mechanism that can store information related to performance parameters monitored by one or more performance-parameter monitors in set of computer systems 106. Loghost 102 can be implemented in any combination of hardware and software. In some embodiments, loghost 102 operates on a computer system such as a server. In other embodiments, loghost 102 operates on one or more service processors. In some embodiments, loghost 102 operates on a computer system in set of computer systems 106. In some embodiments, loghost 102 is co-located with one or more computer systems in set of computer systems 106. In some embodiments, loghost 102 is located separately from all computers in set of computer systems 106. In some embodiments loghost 102 is located at a computer system vendor's data center.

Doctor server 104 can include any mechanism that can receive information related to monitored performance parameters and implement embodiments of the present invention. Doctor server 104 can be implemented in any combination of hardware and software. In some embodiments, doctor server 104 operates on a computer system such as a server. In some embodiments, doctor server 104 operates on one or more service processors. In some embodiments, doctor server 104 operates on a computer system in set of computer systems 106. In some embodiments, doctor server 104 is co-located with one or more computer systems in set of computer systems 106. In some embodiments, doctor server 104 is located separately from all computer systems in set of computer systems 106. In some embodiments doctor server 104 is located at a computer system vendor's data center.

Each computer system in set of computer systems 106 can include but is not limited to a server, a server blade, a data-center server, an enterprise computer, a field-replaceable unit that includes a processor, or any other computation system that includes one or more processors, one or more cores in each processor, and at least one power supply. In some embodiments, computer systems in set of computer systems 106 are at different physical locations. Note that in some embodiments computer systems in set of computer systems 106 include different type of computer systems.

In some embodiments, as depicted in FIG. 1, each computer system in set of computer systems 106 includes a performance-parameter monitor and at least one power supply. The performance-parameter monitor in each computer system can be any device that can monitor performance parameters of a computer system, including but not limited to one or more of the following: a power supply temperature, input voltage to a power supply, input current to a power supply, input power to a power supply, output current from a power supply, output voltage from a power supply, output power from a power supply, acceleration of a power supply, speed of cooling fan in a power supply, total on time of a power supply, total on time of a computer system, efficiency of a power supply, power cycles of a power supply, power cycles of a computer system, output load cycling of a power supply, the speed of other cooling fans in a computer system, loads in a computer system, processor frequency in a computer system, throughput variables in a computer system, transaction latencies in a computer system, time series of any performance parameter, and performance parameters for each processor, core, and power supply in a computer system. Performance parameters can also include but are not limited to performance parameters as set forth in U.S. Pat. No. 7,020,802, entitled "Method and Apparatus for Monitoring and Recording Computer System Performance Parameters," by Kenny C. Gross and Larry G. Votta, Jr., issued on Mar. 28, 2006, which is hereby fully incorporated by reference. In some embodiments, the signature also includes one or more of the following: the make, model, manufacture date, or installation date of the power supply; the physical location of the power supply; the service history of the power supply; the type of computer system the power supply is in; or any other information related to the power supply.

In some embodiments, a signature for the power supply comprises the monitored performance parameters related to a power supply. For example, in some embodiments, the signature of a power supply includes all performance parameters monitored for a power supply. In some embodiments, the generated signature is the signature for the power supply at the time the signature was generated, and at each subsequent time period a new signature is generated based on the monitored performance parameters for the power supply.

A performance-parameter monitor can be implemented in any combination of hardware and software. In some embodiments, a performance-parameter monitor operates on the computer system it is monitoring. In other embodiments, a performance-parameter monitor operates on one or more service processors. In still other embodiments, a performance-parameter monitor operates on a separate computer system. In some embodiments, a performance-parameter monitor operates on one computer system in set of computer systems 106 and monitors performance parameters for one or more computer systems. In some embodiments, a performance-parameter monitor includes a method or apparatus for monitoring and recording computer system performance parameters as set forth in U.S. Pat. No. 7,020,802.

In some embodiments, as depicted in FIG. 1, each computer system in set of computer systems 106 includes at least one power supply. Each power supply in set of computer systems 106 can include any type of power supply, including but not limited to alternating current (AC) to direct current (DC), or DC to DC implemented in any type of technology now known or later developed.

In some embodiments, computer systems in set of computer systems 106 communicate monitored performance parameters directly to doctor server 104 and not through loghost 102. In some embodiments, loghost 102 is not present and all computer systems in set of computer systems 106 communicate monitored performance parameters directly to doctor server 104. In some embodiments, performance parameters are anonymously reported to loghost 102 and/or doctor server 104.

Figure 2:
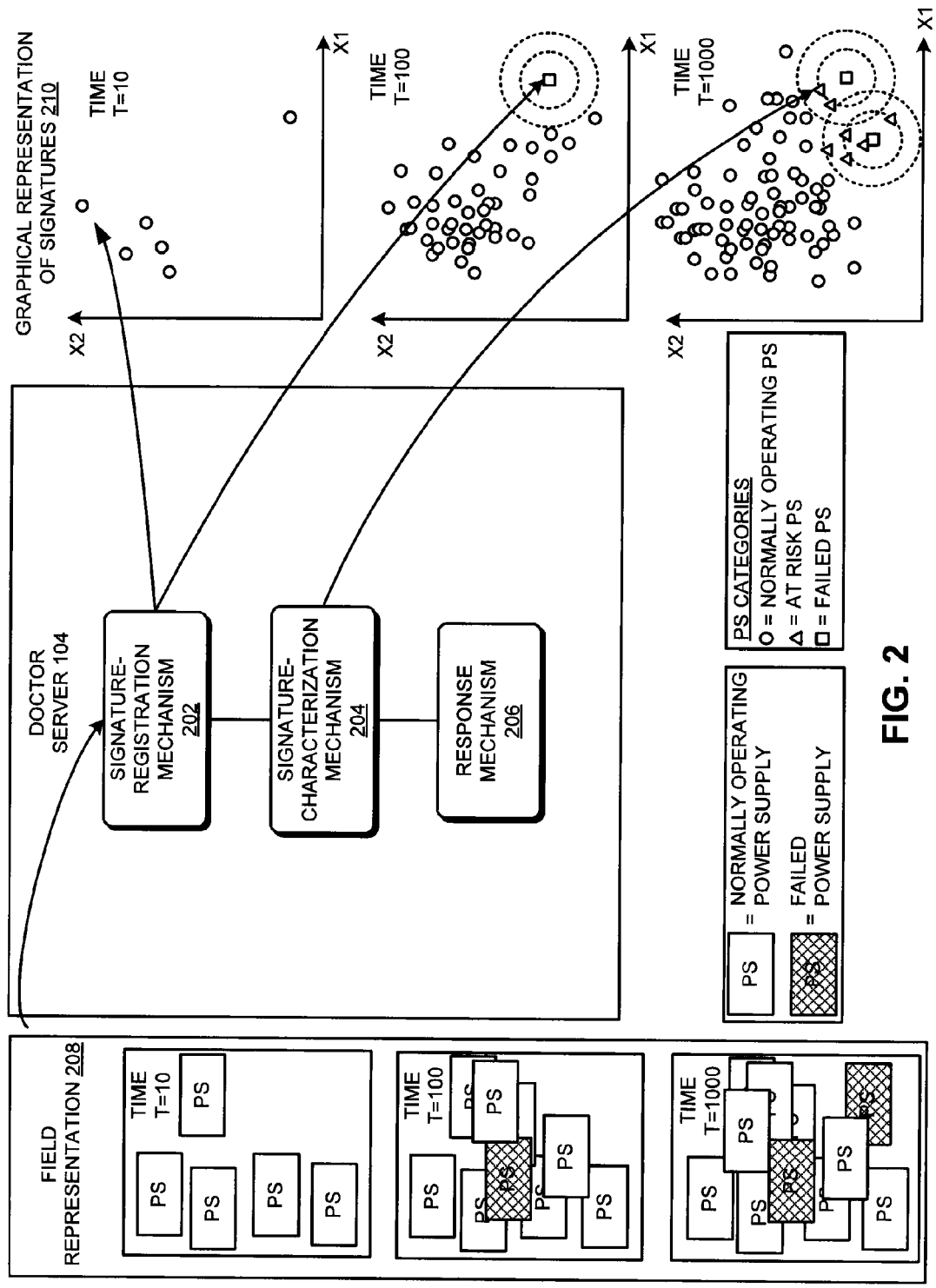
FIG. 2 depicts a simplified graphical representation of a process for characterizing a health of a power supply in a computer system during operation of the computer system in accordance with some embodiments of the present invention.

The operation of embodiments of the present invention will be described with reference to FIG. 2. FIG. 2 depicts a simplified graphical representation of a process for characterizing the health of a power supply in a computer system during operation of the computer system in accordance with some embodiments of the present invention. Referring to FIG. 2, doctor server 104 includes signature-registration mechanism 202, signature-characterization mechanism, and response mechanism 206.

Signature-registration mechanism 202, signature-characterization mechanism 204, and response mechanism 206 can each be implemented in any combination of hardware and software, and each can operate on a separate computer system. Field representation 208 graphically depicts representations of power-supply signatures from computer systems in set of computer systems 106 at three time intervals. The power-supply signatures include working power supplies and failed power supplies. Note that for clarity not all power-supply signatures are represented in field representation 208;

for illustrative purposes, only a representative set of power-supply signatures are shown. Also, note that time is expressed in arbitrary units and the time intervals represented are for illustrative purposes only.

Graphical representation of signatures 210 depicts a simplified graphical representation of signatures sent to doctor server 104. For illustrative purposes, signatures in graphical representation of signatures 210 are represented in a two-dimensional signature space. In embodiments of the invention, signatures can have any number of dimensions necessary to implement embodiments of the invention. In some embodiments, signatures have the number of dimensions required to represent the information contained in the signature. For example, in some embodiments, the number of dimensions of a signature is equal to the number of performance parameters used to generate the signature.

Some embodiments of the present invention operate as follows. Performance-parameter monitors in computer systems in set of computer systems 106 communicate signatures for power supplies in computer systems in set of computer systems 106 to loghost 102. At predetermined intervals, loghost 102 communicates the signatures to doctor server 104. In some embodiments, the signatures are communicated from computer systems in set of computer systems 106 directly to doctor server 104.

As depicted in field representation 208, at time T=10 only signatures of working power supplies have been communicated to doctor server 104. As signatures are communicated to doctor server 104, signature-registration mechanism 202 receives the signatures and records them. In some embodiments, the signatures are recorded in a database in doctor server 104. The signatures received by doctor server 104 are depicted in graphical representation of signatures 210. In some embodiments, power-supply signatures are not classified by signature-characterization mechanism 204 until a signature of a failed power supply is received. In some embodiments, as will be discussed further below, power-supply signatures are classified by signature-characterization mechanism 204 based on received signatures even if no signatures of failed power supplies have been received. In some embodiments, received power-supply signatures are classified based on power signatures that have been pre-loaded in doctor server 104.

As depicted in field representation 208 for time T=100, one signature representing a failed power supply is present. Graphical representation of signatures 210 for time T=100 depicts the power-supply signatures received by signature-registration mechanism 202, including the signature for the failed power supply.

Signature-characterization mechanism 204 characterizes the received signatures based on the received signature for the failed power supply. In some embodiments, signature-characterization mechanism 204 uses a pattern-recognition classifier to characterize the health of power supplies based on a comparison between the signatures for the failed power supply and each of the other power supplies. In some embodiments, more than one classifier is used to classify the power-supply signatures. In some embodiments an R-cloud classifier is used.

In some embodiments, a power-supply signature is characterized based on the distance in signature space between the power-supply signature and one or more failed power-supply signatures. As depicted in graphical representation of signatures 210, signature-characterization mechanism 204 is using a 2-level classifier as represented by the 2 concentric circles surrounding the signature of the failed power supply. There are no signatures at time T=100 that are characterized by the classifier in either of the two categories. In the embodiments represented by FIG. 2, the two classifiers represent two levels of health for power supplies. Power-supply signatures within a distance from a failed power supply represented by the smaller concentric circle are characterized as at higher risk, while those at a distance that falls between the larger concentric circle and the smaller concentric circle are characterized as at lower risk. In some embodiments, three classifiers are used, reflecting three levels of closeness of the power-supply signature to the failed power-supply signatures: low, medium, and high risk. In some embodiments, more than three classifiers are used. In some embodiments, a continuous classification is used to characterize power supplies based on the signature space distance of a power-supply signature from failed power-supply signatures.

In some embodiments, power-supply signatures are characterized in the absence of a signature of a failed power supply based on information including but not limited to one or more of the following: the signature space distance between the power supply and other known working power supplies; and the trajectory of the power supply's signature in signature space compared to the trajectory of other power-supply signatures in signature space.

At time T=1000, field representation 208 shows that there are two failed power supplies. As depicted in graphical representation of signatures 210, at time T=1000, there are two failed signatures in the signature space. Signature-characterization mechanism 204 then uses the two classifiers to characterize power-supply signatures received by doctor server 104. As depicted in graphical representation of signatures 210, there are power-supply signatures that the classifier characterizes as at higher risk and power supplies that the classifier characterizes as at lower risk based on the signature space distance of the power-supply signatures from the failed power-supply signatures.

In some embodiments, when a signature for a power supply is characterized by a classifier as being at an elevated level of risk, response mechanism 206 determines a response based on information including but not limited to one or more of the following: the level of risk determined by a classifier for the signature; the signature space distance to one or more of the failed power supplies; the signature space distance to other working power supplies; the pre-failure signatures of one or more failed power supplies; the trajectory in signature space over time of the power supply, other working power supplies, and/or one or more failed power supplies; the signature space location and/or trajectory of power supplies located physically near the power supply; and/or signature histories of other working power supplies. In some embodiments, the response is also determined based on information including but not limited to one or more of the following: the operating regime that will maximize the remaining useful life of the power supply, the operating regime that will maximize the operational performance of the power supply and/or the computer system until a service call can be made or the power supply problems can otherwise be addressed, and/or the results of previous responses generated by response mechanism 206.

The response determined by response mechanism 206 can include but is not limited to one or more of the following: recommending a power supply operation regime for the power supply; or scheduling a service action for the power supply, such as requesting a service call or flagging the power supply to be inspected or replaced at the next routine maintenance visit. In some embodiments, the recommended response is communicated from doctor server 104 to loghost 102 and from loghost 102 to the computer system containing the power supply at issue. In some embodiments, the recommended response is communicated from doctor server 104, to the computer system containing the power supply at issue without first being sent to loghost 102. In some embodiments, when the computer system with the power supply at issue receives the recommendation from doctor server 104, the computer system acts on the recommendation by accepting it, rejecting it, or determining if further approval or action is required to accept or reject it.

In one embodiment, an example of a recommendation by response mechanism 206 in doctor server 104 and the action taken by the computer system is as follows. Signature-characterization mechanism 204 determines that the computer system signature represents an elevated risk. Response mechanism 206 then determines that a service call for the power supply at issue cannot be immediately scheduled based on the availability of technicians and the customer's service contract level. Response mechanism 206 determines that the power supply will have to take action to extend its useful life by reducing its power output. In order to implement this recommendation, the other power supplies in the computer system will have to take on the extra load by load sharing. The recommendation for the new operating mode for the power supply is sent by doctor server 104 to loghost 102 and from loghost 102 to the computer system. The computer system then determines if the recommended operating regime is feasible. The computer system can also determine if its power requirements can be unevenly shared among its power supplies so that the power supply at issue supplies a lower load level while the other power supplies supply the rest of the load until a service call can be scheduled. In some embodiments, the computer system automatically implements the recommendation if it determines that the recommendation is within its allowable operation mode. In other embodiments, the computer system first notifies an administrator before taking action on the recommendation. In still other embodiments, the recommendations are presented to an administrator, and the administrator determines what action to take.

Figure 3:
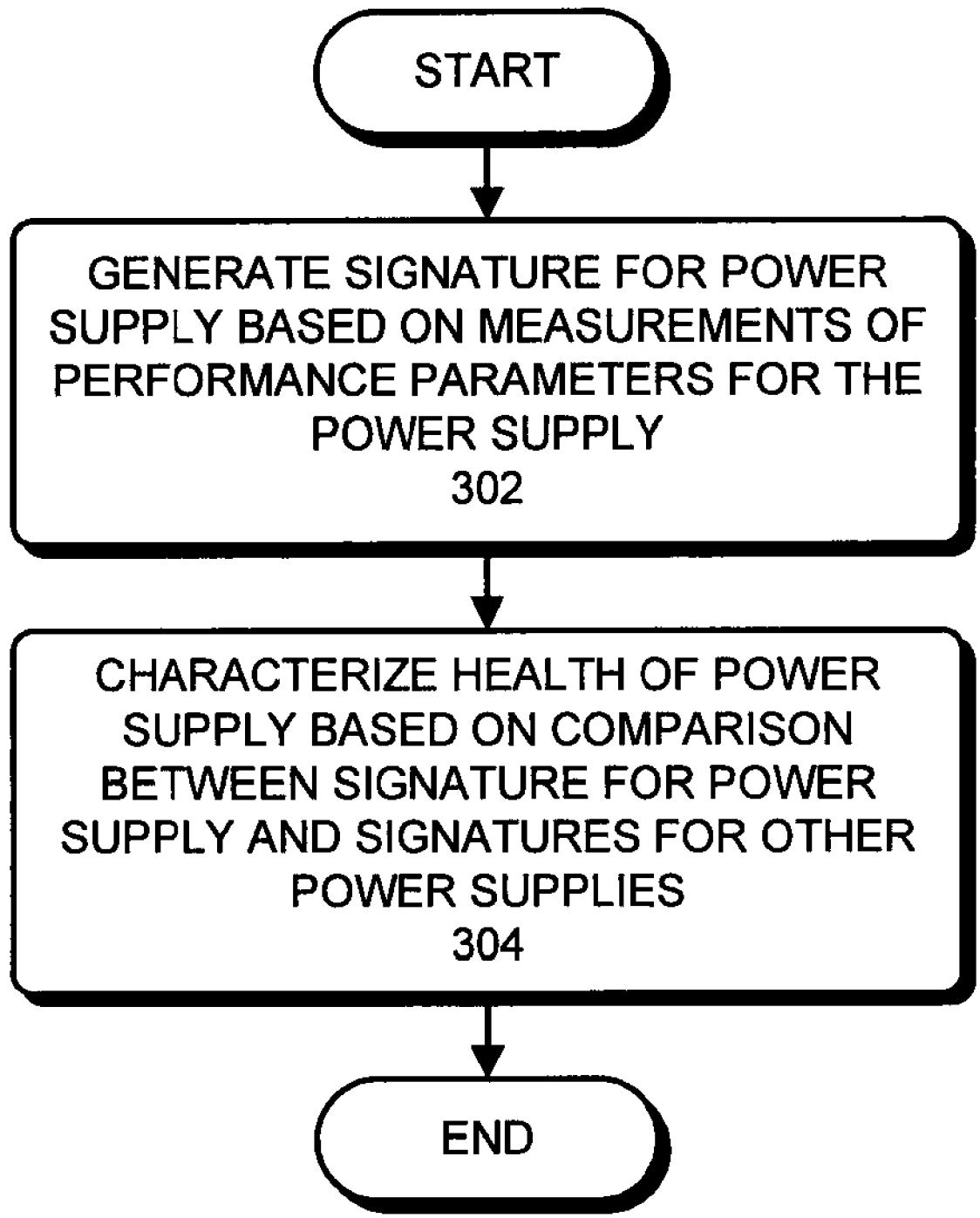
FIG. 3 presents a flowchart illustrating a process for characterizing a health of a power supply in a computer system during operation of the computer system in accordance with some embodiments of the present invention.

FIG. 3 presents a flowchart illustrating a process for characterizing a health of a power supply in a computer system during operation of the computer system in accordance with some embodiments of the present invention. A signature for a power supply in a computer system is generated based on measurements of performance parameters for the power supply while the computer system is operating (step 302). Then the health of the power supply is characterized based on a comparison between the signature for the power supply and signatures for other power supplies (step 304).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for characterizing a health of a power supply in a computer system during operation of the computer system, the method comprising:
   generating a signature for the power supply based on measurements of a set of performance parameters for the power supply;
   communicating the signature to a doctor server;
   communicating other signatures for one or more other power supplies to the doctor server; and
   characterizing the health of the power supply based on a comparison between the signature for the power supply and the other signatures for the one or more other power supplies, wherein characterizing the health of the power supply comprises characterizing the health of the power supply based on signature distances between the signature for the power supply and the other signatures for the one or more other power supplies.

2. The method of claim 1, wherein the one or more other power supplies include failed power supplies.

3. The method of claim 1, wherein:
   characterizing the health of the power supply further includes characterizing the health of the power supply into at least three categories based on the signature distances between the signature for the power supply and the other signatures for the one or more other power supplies.

4. The method of claim 1, wherein:
   characterizing the health of the power supply further includes using a pattern-recognition classifier.

5. The method of claim 1, further including:
   initiating a service action for the power supply based on the health of the power supply.

6. The method of claim 1, further including:
   recommending an operating mode for the power supply based on the comparison between the signature for the power supply and signatures for one or more other power supplies.

7. The method of claim 1,
   wherein generating the signature for the power supply includes systematically monitoring and recording a set of performance parameters; and
   wherein the recording process keeps track of the temporal relationships between events in different performance parameters.

8. A computer-readable storage medium storing instructions that when executed by a computer cause the computer to perform a method for characterizing a health of a power supply in a computer system during operation of the computer system, the method comprising:
   generating a signature for the power supply based on measurements of a set of performance parameters for the power supply;
   communicating the signature to a doctor server;
   communicating other signatures for one or more other power supplies to the doctor server; and
   characterizing the health of the power supply based on a comparison between the signature for the power supply and the other signatures for the one or more other power supplies, wherein characterizing the health of the power supply comprises characterizing the health of the power supply based on signature distances between the signature for the power supply and the other signatures for the one or more other power supplies.

9. The computer-readable storage medium of claim 8, wherein the one or more other power supplies include failed power supplies.

10. The computer-readable storage medium of claim 8, wherein:
    characterizing the health of the power supply further includes characterizing the health of the power supply into at least three categories based on the signature distances between the signature for the power supply and the other signatures for the one or more other power supplies.

11. The computer-readable storage medium of claim 8, wherein:

characterizing the health of the power supply further includes using a pattern-recognition classifier.

12. The computer-readable storage medium of claim 8, further including:
   initiating a service action for the power supply based on the health of the power supply.

13. The computer-readable storage medium of claim 8, further including:
   recommending an operating mode for the power supply based on the comparison between the signature for the power supply and signatures for one or more other power supplies.

14. The computer-readable storage medium of claim 8,
   wherein generating the signature for the power supply includes systematically monitoring and recording a set of performance parameters; and
   wherein the recording process keeps track of the temporal relationships between events in different performance parameters.

15. An apparatus that characterizes a health of a power supply in a computer system during operation of the computer system, the apparatus comprising:
   a generating mechanism that generates a signature for the power supply based on measurements of a set of performance parameters for the power supply;
   a characterizing mechanism that characterizes the health of the power supply based on a comparison between the signature for the power supply and signatures for one or more other power supplies, wherein the characterizing mechanism includes a determining mechanism that determines signature distances between the signature for the power supply and the signatures for the one or more other power supplies; and
   a communicating mechanism that periodically communicates the power-supply signature to a doctor server and periodically communicates the signatures for the one or more other power supplies to the doctor server.

16. The apparatus of claim 15,
   wherein the doctor server includes the characterizing mechanism.

* * * * *